May 29, 1962   J. VACCARO, JR   3,036,477
READOUT MECHANISM
Filed March 30, 1960   2 Sheets-Sheet 1
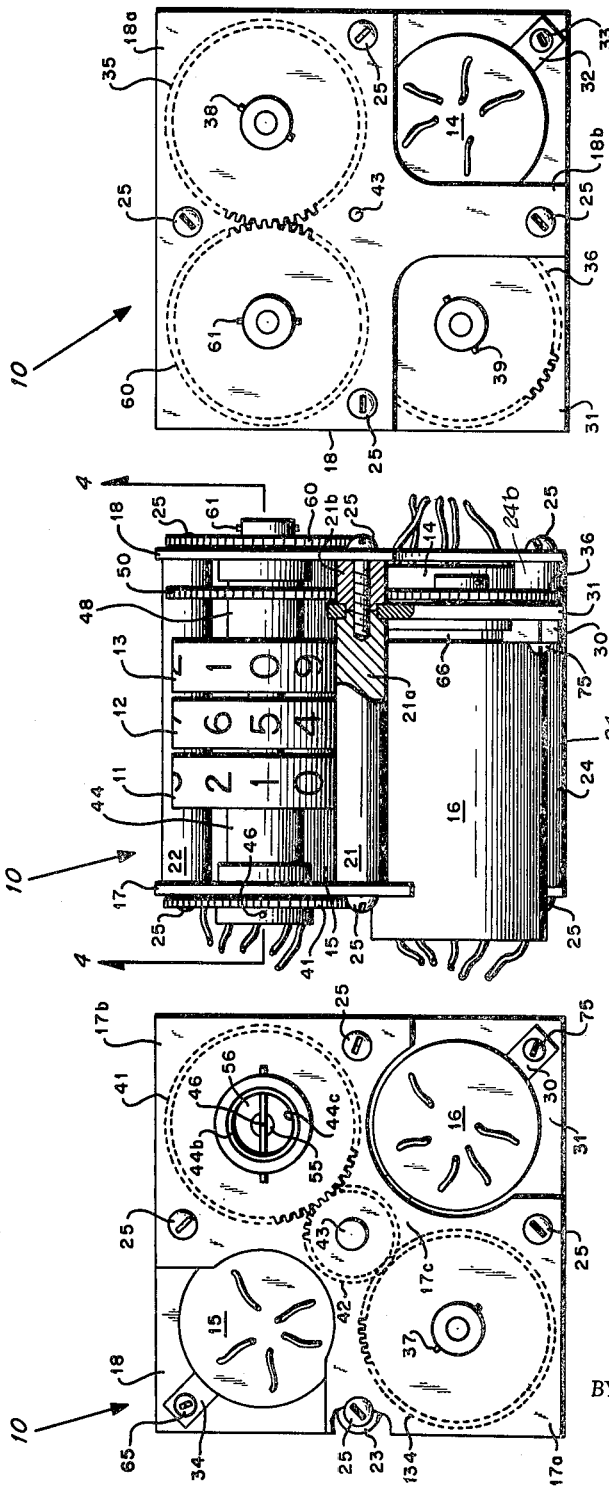
INVENTOR.
JOSEPH VACCARO, JR.
BY
AGENT

United States Patent Office 3,036,477
Patented May 29, 1962

3,036,477
READOUT MECHANISM
Joseph Vaccaro, Jr., Springfield, Pa., assignor to the United States of America as represented by the Secretary of the Navy
Filed Mar. 30, 1960, Ser. No. 18,783
10 Claims. (Cl. 74—665)
(Granted under Title 35, U.S. Code (1952), sec. 266)

The invention described herein may be manufactured and used by or for the Government of the United States of America for governmental purposes without the payment of any royalties thereon or therefor.

The present invention relates to a readout mechanism and more particularly to a mechanism providing a numerical reading.

One of the objects of the invention is the provision of a readout mechanism comprising a plurality of counter wheels which are driven by synchro receivers, the mechanism being small, compact, of relatively light weight, and accordingly suitable for use in aircraft instrumentation.

Another object of the invention is the provision of one or more synchro driven readout counters which are not only lightweight and compact but in which the synchro receivers and counters are formed in a box-shaped package which can be installed or removed as a single unit.

Another object of the invention is the provision of the readout mechanism, as set forth in preceding objects, which is easily maintained and the parts thereof are easily removable for inspection, repair and/or replacement.

Another object of the invention is the provision of a readout mechanism, as set forth in preceding objects, which is economical to manufacture and comprises a minimum of parts which are easy to manufacture and assemble.

A still further object of the invention is the provision of a unitary synchro receiver and readout mechanism which comprises three readout counter wheels having indicia thereon numbered from one to ten and a separate synchro receiver for individually driving each readout counter wheel, the readout wheels being in juxtaposition and coaxial with each other.

The invention further resides in certain novel features of construction, combinations and arrangements of parts, and further objects and advantages of the invention will be apparent to those skilled in the art to which it pertains from the following description of the preferred embodiment thereof, described with reference to the accompanying drawings in which similar reference characters represent corresponding parts throughout the several views, and in which:

FIG. 1 is a side elevational view of a mechanism embodying the invention with parts partially in section to show certain details of construction;

FIG. 2 is an end view of one end of FIG. 1;

FIG. 3 is an end view of an opposite end of FIG. 1; and

Figure 4:
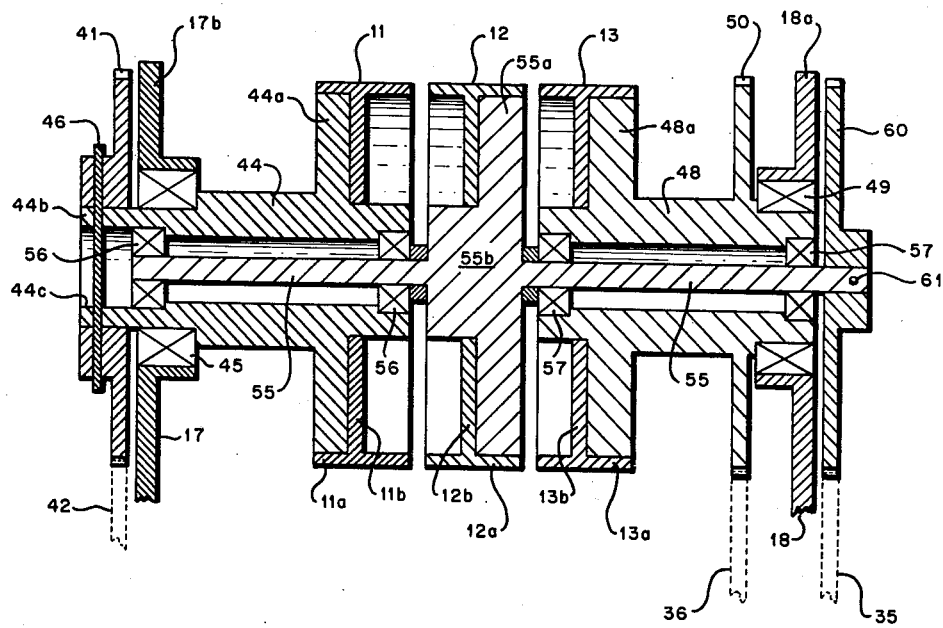
FIG. 4 is a cross sectional view along line 4—4 of FIG. 1.

It is to be understood that the invention is not limited to the details of construction and arrangement of parts shown in the drawings and hereinafter described in detail, but is capable of being otherwise embodied and of being practiced and carried out in various ways. It is to be further understood that the phraseology or terminology employed herein is for the purpose of description and there is no intention to herein limit the invention beyond the requirements of the prior art.

Referring to the drawings, a readout mechanism embodying the invention is indicated generally by the reference numeral 10 and comprises three readout counter wheels 11, 12, and 13, respectively driven by synchro receivers 14, 15 and 16 via gear arrangements which will be subsequently described. Each of the readout counter wheels 11, 12 and 13 is provided with indicia appearing as 1, 2, 3, 4, 5, 6, 7, 8, 9, and 0. The indicia are equiangularly spaced so that 36 degrees of angular movement will cause the indicia to be shifted from one numeral to the next consecutive numeral, usually in a window, not shown.

The wheels 11, 12 and 13 and cylindrically packaged synchros 14, 15 and 16 are mounted in a substantially rectangular shaped package or box frame comprised of end plates 17 and 18 held in parallel relationship by means of four intervening parallelly arranged transverse connecting members 21, 22, 23 and 24, FIGS. 1, 2 and 3. The plates 17 and 18 and the dowels 21, 22, 23 and 24 are held in assembled relationship by fastener means such as round-headed screws 25 threaded into the ends of the members 21, 22, 23 and 24.

The end plate 17 is generally rectangularly-shaped with the exception of oppositely disposed cutouts on the opposite corners thereof so that the end plate 17 is provided with a generally rectangular or spade-shaped portion 17a and a rectangular or spade-shaped portion 17b with a central diagonal, interconnecting portion 17c having a circular opening in the central portion thereof. The cutouts permit the electrical leads to the receivers 15 and 16 to extend outwardly past the end plate 17 unencumbered.

The end plate 18 is of generally rectangular configuration but for the bottom two corners which have been cut out for providing access for the electrical leads of the synchro receiver 14 and the opposite end or shaft end of the synchro receiver 16 so that the end plate 18 actually takes on a configuration of a T. The T has a generally rectangular portion 18a and a central, vertically downwardly extending rectangular portion 18b. The end plates 17 and 18 are formed with four openings near the edges thereof at the center of each side for the location of the screws 25 for the transverse members 21, 22, 23 and 24.

Synchro receiver 16 is provided with a peripheral groove 66 of substantially-rectangular cross section at the right hand or rotor shaft end thereof as shown in FIG. 1 so as to accommodate a lip or flange of each of two small clamps, of which only clamp 30 is shown, for holding the synchro receiver 16 in position and flush against a substantially rectangular or quarter plate 31. The plate 31, at its inner corner, is rounded so as not to interfere with the adjacent receivers 14, 15 fixed to and supported by the members 21 and 24, the plate being spaced from the end plate 18 by a relatively short distance while being spaced from the end plate 17 by about six times that distance. Preferably, the members 21 and 22 are formed in two pieces 21a, 21b and 24a, 24b so that the square plate 31 can be sandwiched between the portions 21a, 21b and the portions 24a, 24b and held in rigid parallel relationship with the end plates 17, 18. More particularly the ends of the members 21a, b, and 24a, b are of reduced diameter so as to be self centering in the openings in the plate 31. The ends of the members 21a, 22, 23 and 24a are internally threaded for receiving the screws 25. The pieces 21b and 24b are internally threaded throughout the lengths thereof. The diameters of the members 21, 22, 23 and 24 exceed the diameters of the holes in the plates 17 and 18 for the screws 25.

Intermediate wall 31 on which synchro 16 is anchored is a square shaped plate rounded at its inner corner approximately one-fourth the size of end plates 17 and 18. Wall 31 is secured to and spaced from end plate 17 by members 21 and 24 as best shown in FIGS. 1 and 2. Members 21 and 24 are each composed of two parts 21a, 21b, 24a, and 24b. As shown in FIG. 1 members 21a and 21b have a smaller diameter at the ends associated with plate 31, whereby each end is fitted into a hole at one corner of plate 31. Member 21b has a threaded bore throughout its length and member 21a has a threaded bore throughout part of the end which meets member 21b. Members 24a and 24b are similarly arranged. Plate 31 is secured to end wall 17 at its diagonal corner by member 24 which has the same configuration as member 21, described above.

The synchro receiver 14, FIG. 2, is also provided with a peripheral groove similar to groove 66 for accommodating the lip or flange of a wedge clamp 32, similar to wedge clamp 30. The clamp 32 is fastened to the inner surface of plate 17 by means of screw 33, FIG. 2. Only one clamp 32 is shown, the other clamp is on the opposite side of the synchro 14.

The synchro receiver 15 is similarly fitted to the inner surface of the plate 18 by means of a wedge clamp 34. The wedge clamp 34, similar to wedge clamps 30 and 32, has a lip or flange portion fitting into a peripheral groove of the synchro receiver 15. A screw 65 secures the wedge clamp 34 to the end plate 18 at the upper left hand corner thereof, FIG. 3. A clamp similar to clamp 34 is located on a hidden side of the synchro receiver 15. It is apparent then that all three synchro receivers 14, 15 and 16 are secured in similar fashion by means of two clamps to the plates 17, 18 and 31, respectively.

The rotors of each of the synchros 14, 15 and 16 are each provided with an externally-toothed gear 134, 35, 36 respectively, which are pinned thereto by means of transverse pins 37, 38, 39. The gears 134, 35, 36 respectively drive the counter wheels 11, 12 and 13 in the following manner.

Referring to FIG. 4, the readout counter wheels 11, 12 and 13 are shown to be each formed of cylindrical rim portions 11a, 12a, 13a with an annular radially inwardly directed flange portion 11b, 12b, 13b so as to provide a radial cross-section that is T-shaped. The synchro receiver 14 drives the gear 34, which is fixed to the synchro receiver rotor by means of a pin 37. The gear 134 drives the counter wheel 11 by means of a gear 41 through a centrally located idler gear 42. The idler gear 42 is rotatably mounted on the end plate 17 at the central opening therein by means of a screw fastener 43, FIG. 3. The idler gear 42 is necessary so that the wheel 11 will be driven in the same direction as the wheels 12 and 13 since the synchro receiver 14 faces in a direction opposite to the synchro receivers 15 and 16. More particularly, the wheel 11 is fastened to a radially extending flange 44a of a tubular hub portion 44 which extends through the portion 17b of the end plate 17 and is journaled therein by means of an antifriction bearing assembly 45. The left hand end 44b of the tubular hub 44 is adapted to carry the gear 41 which is fixed thereto by means of a transverse pin 46.

Similarly, the wheel 13 is mounted upon a flange portion 48a of a right hand tubular hub 48 which is journaled in an antifriction bearing assembly 49 in the end plate 18. A radially extending, externally-toothed gear 50 is integrally formed with the tubular portion 48 intermediate the ends thereof. The gear 50 meshes with the gear 36 driven by the synchro receiver 16, best shown in FIGS. 2 and 4.

The center counter wheel 12 is fixed to a radially extending flange portion 55a centrally of a spindle shaft 55 which extends longitudinally in both directions from the wheel 12, FIG. 4, substantially throughout the length of the hubs 44 and 48. The spindle shaft 55 is journaled in the hubs 44, 48 by means of two pairs of antifriction bearings 56 and 57, respectively. The one pair of bearings 57 is axially spaced with one bearing being located at the outer end of the hub 48 and with the other bearing being located at the inner end of the hub 48. Similarly, of the other pair of bearings 56, one bearing is located at the outer end of hub 44 and the other bearing is located at the inner end of the hub 44 in juxtaposition with the enlarged cylindrical portion 55a of the spindle shaft 55. The bearing 56 carried by the outer end of the hub 44 and the spindle shaft 55 is positioned within a counterbore portion 44c of the hub 44.

The synchro receiver 15 drives a gear 60 which is mounted on the right hand end of the spindle shaft 55 and fixed thereto by a pin 61. The synchro receiver 15 drives the center wheel 12 via the gears 35 and 60, respectively.

In summary, the synchro receiver 14 drives the counter wheel 11 via gears 134, 42 and 41. The synchro receiver 15 drives the counter wheel 12 via gears 35 and 60. The synchro receiver 16 drives the counter wheel 13 via gears 36 and 50. In order that the digits on the wheels 11, 12 and 13 are accurately positioned by the synchro receivers 14, 15 and 16, respectively, the respective transmitters for the receivers, not shown, are provided with Geneva stop devices for dividing the rotation of the wheels into 36 degree increments.

It will be understood that the invention may be modified to adapt it to various circumstances and conditions, and it is accordingly desired to comprehend within the purview of this invention such modifications as may be considered to come within the scope of the appended claims.

What is claimed is:

1. A readout mechanism comprising, a first readout counter wheel having numerical indicia thereon, a second readout counter wheel having numerical indicia thereon, a third readout counter wheel having numerical indicia thereon, a spindle shaft having said second wheel fixed to a central portion thereof for rotation therewith, a first hub having said first wheel fixed thereto in juxtaposition with said second wheel, said first hub being journaled on one end of said spindle shaft, a first end wall having one end of said first hub extending therethrough and journaled therein, a second hub journaled on the other end of said spindle shaft and having said third wheel fixed thereto in juxtaposition with said second wheel, a second end wall having one end of said second hub extending therethrough and journaled therein, said first, second and third wheels being coaxial, a first synchro receiver fixed to said first end wall and having a first rotor shaft extending therethrough, a first gear fixed to and driven by said first rotor shaft, an idler gear journaled on said first end wall and driven by said first gear, a third gear fixed to said first hub and driven by said idler gear, a second synchro receiver fixed to said second end wall and having a second rotor shaft extending therethrough, a fourth gear fixed to said second rotor shaft, a fifth gear fixed to said other end of said spindle and driven by said fourth gear, an intermediate wall disposed between said first end wall and said second end wall, said intermediate wall being closer to said second end wall than said first end wall, cross members connecting said intermediate wall to said first and second end walls, a third synchro receiver fixed to said intermediate wall and having a third rotor shaft extending therethrough, a sixth gear fixed to said third rotor shaft and driven by said third synchro receiver, a seventh gear integrally connected to an intermediate portion of said second hub and driven by said sixth gear, said first end wall having arcuate cutout portions in diagonally opposite corners thereof for permitting the unencumbered passage of the electrical leads for said second and third synchro receivers, and said second end wall being generally T-shaped for permitting the unencumbered passage of electrical leads to said first synchro receiver and access to said sixth gear on said third rotor shaft, said synchro receivers each having a cylindrical housing with an annular groove in the external surface thereof, and clamp means having flange portions interposed in the groove of each said synchro receivers for securing the latter to said end walls.

2. A readout mechanism comprising, a first readout counter wheel, a second readout counter wheel, a third readout counter wheel, a spindle shaft having said second wheel fixed to a central portion thereof for rotation therewith, a first hub having said first wheel fixed thereto in juxtaposition with said second wheel, said first hub being journaled on one end of said spindle shaft, a first end wall having one end of said first hub extending therethrough and journaled therein, a second hub journaled on the other end of said spindle shaft and having said third wheel fixed thereto in juxtaposition with said second wheel, a second end wall having one end of said second hub extending therethrough and journaled therein, a first synchro receiver fixed to said first end wall and having a first rotor shaft extending therethrough, a first gear fixed to and driven by said first rotor shaft, an idler gear journaled on said first end wall and driven by said first gear, a third gear fixed to said first hub and driven by said idler gear, a second synchro receiver fixed to said second end wall and having a second rotor shaft extending therethrough, a fourth gear fixed to said second rotor shaft, a fifth gear fixed to said other end of said spindle and driven by said fourth gear, an intermediate wall disposed between said first end wall and said second end wall, said intermediate wall being closer to said second end wall than said first end wall, cross members connecting said intermediate wall to said first and second end walls, a third synchro receiver fixed to said intermediate wall and having a third rotor shaft extending therethrough, a sixth gear fixed to said third rotor shaft and driven by said third synchro receiver, a seventh gear integrally connected to an intermediate portion of said second hub and driven by said sixth gear, said first end wall having arcuate cutout portions in diagonally opposite corners thereof for permitting the unencumbered passage of the electrical leads for said second and third synchro receivers, and said second end wall being generally T-shaped for permitting the unencumbered passage of electrical leads to said first synchro receiver and access to said sixth gear on said third rotor shaft.

3. A readout mechanism comprising, a first readout counter wheel, a second readout counter wheel, a third readout counter wheel, a spindle shaft having said second wheel fixed to a central portion thereof for rotation therewith, a first hub having said first wheel fixed thereto in juxtaposition with said second wheel, said first hub being journaled on one end of said spindle shaft, a first end wall having one end of said first hub extending therethrough and journaled therein, a second hub journaled on the other end of said spindle shaft and having said third wheel fixed thereto in juxtaposition with said second wheel, a second end wall having one end of said second hub extending therethrough and journaled therein, a first synchro receiver fixed to said first end wall and having a first rotor shaft extending therethrough, a first gear fixed to and driven by said first rotor shaft, an idler gear journaled on said first end wall and driven by said first gear, a third gear fixed to said first hub and driven by said idler gear, a second synchro receiver fixed to said second end wall and having a second rotor shaft extending therethrough, a fourth gear fixed to said second rotor shaft, a fifth gear fixed to said other end of said spindle and driven by said fourth gear, an intermediate wall disposed between said first end wall and said second end wall, said intermediate wall being closer to said second end wall than said first end wall, cross members connecting said intermediate wall to said first and second end walls, a third synchro receiver fixed to said intermediate wall and having a third rotor shaft extending therethrough, a sixth gear fixed to said third rotor shaft and driven by said third synchro receiver, a seventh gear integrally connected to an intermediate portion of said second hub and driven by said sixth gear, and said first end wall having arcuate cutout portions in diagonally opposite corners thereof for permitting the unencumbered passage of the electrical leads for said second and third synchro receivers.

4. A readout mechanism comprising, a first readout counter wheel, a second readout counter wheel, a third readout counter wheel, a spindle shaft having said second wheel fixed to a central portion thereof for rotation therewith, a first hub having said first wheel fixed thereto in juxtaposition with said second wheel, said first hub being journaled on one end of said spindle shaft, a first end wall having one end of said first hub extending therethrough and journaled therein, a second hub journaled on the other end of said spindle shaft and having said third wheel fixed thereto in juxtaposition with said second wheel, a second end wall having one end of said second hub extending therethrough and journaled therein, a first synchro receiver fixed to said first end wall and having a first rotor shaft extending therethrough, a first gear fixed to and driven by said first rotor shaft, an idler gear journaled on said first end wall and driven by said first gear, a third gear fixed to said first hub and driven by said idler gear, a second synchro receiver fixed to said second end wall and having a second rotor shaft extending therethrough, a fourth gear fixed to said second rotor shaft, a fifth gear fixed to said other end of said spindle and driven by said fourth gear, an intermediate wall disposed between said first end wall and said second end wall, said intermediate wall being closer to said second end wall than said first end wall, cross members connecting said intermediate wall to said first and second end walls, a third synchro receiver fixed to said intermediate wall and having a third rotor shaft extending therethrough, a sixth gear fixed to said third rotor shaft and driven by said third synchro receiver, and a seventh gear integrally connected to an intermediate portion of said second hub and driven by said sixth gear.

5. A readout mechanism comprising, a first readout counter wheel, a second readout counter wheel, a third readout counter wheel, a spindle shaft having said second wheel fixed thereto for rotation therewith, a first hub having said first wheel fixed thereto, said first hub being journaled on said spindle shaft, a first end wall having said first hub journaled therein, a second hub journaled on said spindle shaft and having said third wheel fixed thereto, a second end wall having said second hub journaled therein, a first synchro receiver fixed to said first end wall, a first gear fixed to and driven by said first rotor shaft, an idler gear journaled on said first end wall and driven by said first gear, a third gear fixed to said first hub and driven by said idler gear, a second synchro receiver fixed to said second end wall, a fourth gear fixed to said second rotor shaft, a fifth gear fixed to said spindle and driven by said fourth gear, an intermediate wall disposed between said first end wall and said second end wall, cross members connecting said intermediate wall to said first and second end walls, a third synchro receiver fixed to said intermediate wall and having a third rotor shaft, a sixth gear fixed to said third rotor shaft and driven by said third synchro receiver, and a seventh gear connected to said second hub and driven by said sixth gear.

6. A readout mechanism comprising, a first readout counter wheel, a second readout counter wheel, a spindle shaft having said second wheel fixed thereto for rotation therewith, a first hub having said first wheel fixed thereto in juxtaposition with said second wheel, said first hub being journaled on said spindle shaft, a first end wall having one end of said first hub extending therethrough and journaled therein, a second end wall having one end of said spindle shaft extending therethrough and journaled therein, a first synchro receiver fixed to said first end wall and having a first rotor shaft extending therethrough, a first gear fixed to and driven by said first rotor shaft, an idler gear journaled on said first end wall and driven by said first gear, a third gear fixed to said first hub and driven by said idler gear, a second synchro receiver fixed to said second end wall and having a second rotor shaft extending therethrough, a fourth gear fixed to said second rotor shaft, a fifth gear fixed to said other end of said spindle and driven by said fourth gear, and cross members interconnecting said first and second end walls.

7. A readout mechanism comprising, a spindle shaft, a first hub, said first hub being journaled on one end of said spindle shaft, a first end wall having one end of said first hub extending therethrough and journaled therein, a second hub journaled on the other end of said spindle shaft, a second end wall having one end of said second hub extending therethrough and journaled therein, a first synchro receiver fixed to said first end wall and having a first rotor shaft extending therethrough, a first gear fixed to and driven by said first rotor shaft, an idler gear journaled on said first end wall and driven by said first gear, a third gear fixed to said first hub and driven by said idler gear, a second synchro receiver fixed to said second end wall and having a second rotor shaft extending therethrough, a fourth gear fixed to said second rotor shaft, a fifth gear fixed to said other end of said spindle and driven by said fourth gear, an intermediate wall disposed between said first end wall and said second end wall, said intermediate wall being closer to said second end wall than said first end wall, cross members connecting said intermediate wall to said first and second end walls, a third synchro receiver fixed to said intermediate wall and having a third rotor shaft extending therethrough, a sixth gear fixed to said third rotor shaft and driven by said third synchro receiver, a seventh gear integrally connected to an intermediate portion of said second hub and driven by said sixth gear, said synchro receivers each having a cylindrical housing with an annular groove in the external surface thereof adjacent the end through which the rotor shaft extends, and clamp means having flange portions interposed in the grooves of said synchro receivers for securing the latter to said end walls.

8. A readout mechanism comprising, a spindle shaft, a first hub, said first hub being journaled on one end of said spindle shaft, a first end wall having one end of said first hub extending therethrough and journaled therein, a second hub journaled on the other end of said spindle shaft, a second end wall having one end of said second hub extending therethrough and journaled therein, a first synchro receiver fixed to said first end wall and having a first rotor shaft extending therethrough, a first gear fixed to and driven by said first rotor shaft, an idler gear journaled on said first end wall and driven by said first gear, a third gear fixed to said first hub and driven by said idler gear, a second synchro receiver fixed to said second end wall and having a second rotor shaft extending therethrough, a fourth gear fixed to said second rotor shaft, a fifth gear fixed to said other end of said spindle and driven by said fourth gear, an intermediate wall disposed between said first end wall and said second end wall, said intermediate wall being closer to said second end wall than said first end wall, cross members connecting said intermediate wall to said first and second end walls, a third synchro receiver fixed to said intermediate wall and having a third rotor shaft extending therethrough, a sixth gear fixed to said third rotor shaft and driven by said third synchro receiver, and a seventh gear integrally connected to an intermediate portion of said second hub and driven by said sixth gear.

9. A readout mechanism comprising, a spindle shaft, a first hub, said first hub being journaled on one end of said spindle shaft, a first end wall having one end of said first hub extending therethrough and journaled therein, a second hub journaled on the other end of said spindle shaft, a second end wall having one end of said second hub extending therethrough and journaled therein, a first shaft carried by said first end wall, a first gear fixed to said first shaft, an idler gear journaled on said first end wall and meshing with said first gear, a third gear fixed to said first hub and meshing with said idler gear, a second shaft carried by said second end wall, a fourth gear fixed to said second shaft, a fifth gear fixed to said other end of said spindle and driven by said fourth gear, an intermediate wall disposed between said first end wall and said second end wall, said intermediate wall being closer to said second end wall than said first end wall, cross members connecting said intermediate wall to said first and second end walls, a third shaft carried by said intermediate wall, a sixth gear fixed to said third shaft, and a seventh gear connected to an intermediate portion of said second hub and driven by said sixth gear.

10. A readout mechanism comprising, a first readout counter wheel, a second readout counter wheel, a spindle shaft, a first hub having said first wheel fixed thereto, said first hub being journaled on one end of said spindle shaft, a first end wall having one end of said first hub extending therethrough and journaled therein, a second hub journaled on the other end of said spindle shaft and having said second wheel fixed thereto adjacent said first wheel, a second end wall having one end of said second hub extending therethrough and journaled therein, a first synchro receiver fixed to said first end wall and having a first rotor shaft extending therethrough, a first gear fixed to and driven by said first rotor shaft, an idler gear journaled on said first end wall and driven by said first gear, a third gear fixed to said first hub and driven by said idler gear, an intermediate wall disposed between said first end wall and said second end wall, said intermediate wall being closer to said second end wall than said first end wall, cross members connecting said intermediate wall to said first and second end walls, a second synchro receiver fixed to said intermediate wall and having a second rotor shaft extending therethrough, a fourth gear fixed to said second rotor shaft and driven by said second synchro receiver, and a fifth gear integrally connected to an intermediate portion of said second hub and driven by said fourth gear.

References Cited in the file of this patent

UNITED STATES PATENTS

| | | |
|---|---|---|
| 1,872,126 | Daine et al. | Aug. 16, 1932 |
| 1,952,513 | Reynolds | Mar. 27, 1934 |
| 2,128,707 | Johanson | Aug. 30, 1938 |
| 2,577,663 | Owens | Dec. 4, 1951 |